United States Patent [19]

Kawakami et al.

[11] Patent Number: 5,200,501

[45] Date of Patent: Apr. 6, 1993

[54] EASILY-SLIDABLE POLYARYLENE THIOETHER FILM AND PROCESS FOR PRODUCING THE SAME

[75] Inventors: Yukichika Kawakami; Zenya Shiiki, both of Iwaki, Japan

[73] Assignee: Kureha Kagaku Kogyo Kabushiki Kaisha, Tokyo, Japan

[21] Appl. No.: 660,842

[22] Filed: Feb. 26, 1991

Related U.S. Application Data

[60] Division of Ser. No. 382,033, Jul. 19, 1989, which is a continuation of Ser. No. 120,834, Nov. 16, 1987, abandoned.

[30] Foreign Application Priority Data

Nov. 20, 1986 [JP] Japan ................... 61-276999

[51] Int. Cl.$^5$ .............................................. C08G 75/00
[52] U.S. Cl. .................... 528/388; 525/537; 525/539; 264/235; 264/235.6; 264/235.8; 264/340; 264/341; 264/289.3; 264/289.6
[58] Field of Search ............... 528/388; 525/537, 539; 264/235, 235.6, 235.8, 340, 341, 289.3, 289.6

[56] References Cited

U.S. PATENT DOCUMENTS

| | | | |
|---|---|---|---|
| 4,071,509 | 1/1978 | Edmonds, Jr. ............... | 528/492 |
| 4,286,018 | 8/1981 | Asakura et al. .............. | 528/388 |
| 4,299,951 | 11/1981 | Campbell ..................... | 528/388 |
| 4,377,660 | 3/1983 | Vives et al. .................. | 524/494 |
| 4,405,767 | 9/1983 | Beever et al. ................ | 525/537 |
| 4,540,620 | 9/1985 | Johnson et al. .............. | 525/537 |
| 4,774,298 | 9/1988 | Mizuno et al. ............... | 525/535 |
| 4,810,566 | 3/1989 | Kawakami et al. ........... | 528/388 |
| 4,897,307 | 1/1990 | Beck et al. ................... | 428/398 |

FOREIGN PATENT DOCUMENTS 0233494 8/1987 European Pat. Off. .

Primary Examiner—Melvyn I. Marquis
Assistant Examiner—Helen F. Lee
Attorney, Agent, or Firm—Oblon, Spivak, McClelland, Maier & Neustadt

[57] ABSTRACT

The present invention discloses an easily-slidable polyarylene thioether film comprising a film containing, as the basic resin, a polyarylene thioether mainly composed of repeating unit of

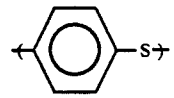

and not containing substantial amount of powder lubricant, having at least one side surface of the arithmetic average surface roughness within the range of 2 to 200 nm and a high strength, and a process to produce the same.

3 Claims, 3 Drawing Sheets

EASILY-SLIDABLE POLYARYLENE THIOETHER FILM AND PROCESS FOR PRODUCING THE SAME

This is a division of application Ser. No. 07/382,033, filed on Jul. 19, 1989, which is a continuation of application Ser. No. 07/120,834, filed Nov. 16, 1987, now abandoned.

BACKGROUND OF THE INVENTION

The present invention concerns an easily-slidable polyarylene thioether film not containing a substantial amount of powdery lubricant, as well as a production process therefor.

Specifically, the present invention relates to an easily-slidable film obtained by treating with an organic solvent at least one side of a substantially amorphous film comprising, as a basic resin, polyarylene thioether having a repeating unit of as a main constituent and not containing a substantial amount of powdery lubricant, to make the crystallization degree of its surface layer higher than that of its inside and then stretching and heat treating the solvent-treated film to make an arithmetic average surface roughness, Ra, of 2 to 200 nm.

The present invention also relates to the production process thereof.

Hitherto, in the field of electronic and electric products, particularly, film-like products such as magnetic recording materials, capacitor films and insulation films, various kinds of synthetic resin films, among al, easily-slidable films have been used in a great amount as base films. Particularly, in the field of heat resistant and easily-slidable film, polyester films or polyimide fields have been employed as the base films.

These films have been useful as described above. However, recording materials vapor-deposited with magnetic material or chip capacitors have been marketed remarkably in recent years and it has been pointed out that polyester films are insufficient in its heat resistivity to such applications. Accordingly, easily-slidable films having higher heat resistivity have been desired. While on the other hand, there has been a problem in the polyimide films which are extremely excellent in its heat resistance that they are extremely costly, difficult for melt formation of film and have large humidity expansion coefficient. Therefore, they are not suitable for general purposes.

In view of the above, as easily-slidable base film comprising polyarylene thioether (hereinafter simply referred to as PATE) has been disclosed as one of potential candidates for the easily-slidable base films which can easily be formed into films by melt processing and have well balanced properties such as heat resistance, mechanical property, dimensional stability and economical advantage in Japanese Patent Application Laid-Open (KOKAI) No. 55-34968 (1980). However, as far as the present inventors recognize, there has been a problem that preparation of an easily-slidable base film with small arithmetic average surface roughness and without abnormally coarse projections from the surface (for example, films for vapor deposition) is difficult by the disclosed method of adding powder additives such as calcium carbonate, since defects or abnormally coarse projections from the surface of the film are liable to be formed. Further, there is a technical limit for preparing powdery additives of small size and it is difficult to disperse such additives of small size uniformly in a film with no agglomeration. Furthermore, there has also been a problem in the method that it is almost impossible to make only one surface slidable.

As a method of producing an easily-slidable film without using powdery additives, it has also been known to mechanically roughen a film surface by pinching with a rough-surface-roll. However, there has been problems that it is difficult to prepare an easily-slidable film with a small arithmetic average surface roughness by such a mechanical method. Therefore, a film prepared by such mechanical method is not suitable for the use, where an easily-slidably film of particularly small arithmetic average surface roughness is required, for instance, applications for magnetic tapes or magnetic floppy discs prepared by vapor deposition.

As a method of producing a PATE base film capable of satisfying both conditions that only on side can be made easily-slidable and that its arithmetic average surface roughness is small and substantially no abnormally coarse projections from the surface are present, there may be a method of coating a rough surface layer on a film having a smooth surface.

However, such a method involves problems that the operation of winding or rewinding the smooth surface film to and from a roll or a machine for the surface coating is difficult because such films easily stick together and that the binder have poor heat resistivities.

The present inventors have made an extensive study for overcoming the foregoing problems and, as a result, have found that an easily-slidable PATE film capable of dissolving the foregoing problems altogether can be obtained by utilizing fine projections of PATE per se formed on the film surface instead of using the powdery additive and have accomplished the present invention on the basis of such a finding.

SUMMARY OF THE INVENTION

The object of the present invention is to provide a potentially easily-slidable PATE film prepared by treating at least one side of a film comprising, as a basic resin, PATE having a repeating unit of as a main constituent not containing a substantial amount of powdery lubricant and being substantially amorphous, to increase the crystallization degree of the treated surface of the film greater than that of its inside and then applying stretching and heat treatment to the potentially easily-slidable PATE film for making the easily-slidable film having the strength of a predetermined level, the arithmetic average surface roughness Ra of the treated surface 2 to 200 nm and the dynamic friction coefficient $\mu k$ of 0.1 to 0.6.

Still a further object of the present invention is to provide an process for producing the easily-slidable PATE films described above.

BRIEF EXPLANATION OF THE DRAWINGS

1. An amorphous layer of an amorphous film
1a. An amorphous layer of the film after the solvent treatment
1b. An amorphous layer remaining after stretching
2. A crystallized layer, coarsely cracked, formed by the solvent treatment
2a. A crystallized layer divided into pieces by stretching
A. Treatment with the solvent
B. Stretching

DETAILED DESCRIPTION OF THE INVENTION

The easily-slidable PATE film according to the present invention is the film obtained by applying stretching, heat treatment, etc. to a potentially easily-slidable film, which comprises a substantially amorphous film containing, as a basic resin, PATE having a repeating unit of as a main constituent and not containing a substantial amount of powdery lubricant and at least the one surface of which is greater in the crystallization degree than its inside, so that at least one side of the easily-slidable film has surface properties, i.e., arithmetic average surface roughness, Ra, in the range of 2 to 200 nm and the dynamic friction coefficient $\mu j$ in a range of 0.1 to 0.6. The film also has a strength at a break of not less than 15 kg/mm$^2$, elongation at break of not less than 20%, the tensile modulus of elasticity of not less than 300 kg/mm$^2$ and melting point of 260° C. or higher.

Further, the characteristic features of the process for producing the easily-slidable PATE film according to the present invention comprises treating (1) at least one surface of a film comprising, as a basic resin, PATE having a repeating unit of as a main constituent, not containing substantial amount of powdery lubricant and being substantially amorphous, by at least one organic solvent with the solubility parameter (SP value) in the range of 89.5 to 11.5 or a mixture of said solvent and water, alcohol type solvent, of aliphatic hydrocarbon type solvent, in a liquid or vapor phase, at a temperature of a solidifying point of the solvent (solvent used along or as a mixture) to 130° C., thereby obtaining a potentially easily-slidable PATE film in which the degree of crystallization of the treated surface is made higher than that of its inside and (2) subjecting the potentially easily-slidable film to stretching in one or two directions by means of simultaneous stretching, of sequential stretching or of both methods at a temperature in a range of 70° to 130° C., at an area factor of 4 to 18 and during a time in a range of 1 to 2,000 seconds and, if necessary, further to heat treatment at a temperature in a range of 180° to 280° C. and during a time in a range of 1 to 2,000 seconds.

Further, according to the present invention, all of the foregoing problems of the conventional easily-slidable films in the prior art have been overcome.

Namely, since the present invention does not use powdery lubricant as the surface roughening material, problems accompanied by its use are not naturally present and, in addition, since the roughened surface formed on the film is produced by crystallizing only the surface portion of the film thereby making the behavior of the surface portion different from that of its inside portion, roughening the one surface only can be accomplished easily. Further, the easily-slidable film according to the present invention is produced by a production processes comprising, a step treating the surface with liquid or gas and a stretching step, so there is no actual problem in practicing.

The easily-slidable PATE film according to the present invention can be used in various applications as it is or as a substrate, on which magnetic layer, pigmented layer, plating layer or other layer is formed by means of coating, vapor deposition, etc., namely, base film (later, will be described in detail). In view of the application of PATE films, it can be said that the easily-slidable PATE film according to the present invention is particularly useful as a base film on which a magnetic layer is to be applied.

Principle for the Surface Roughening

The surface roughening in the present invention is based on a novel principle or idea found by the present inventors, and the properties of PATE film have been wisely utilized.

Specifically, it has been found that (i) when a surface of an amorphous PATE film is treated by an organic solvent having an adequate affinity to PATE at a much lower temperature than that causing dissolution or swelling of PATE, only the PATE in the film surface portion is crystallized to reduce the elongation as compared with that of the substantially amorphous PATE in its inside portion. As the method of crystallizing only the surface portion of a substantially amorphous PATE film and reducing the elongation of the surface portion of the film compared with that of its inside portion, heat treatment, radiation treatment, UV-radiation, laser radiation, chemical treatment such as oxidation or the combination thereof can also be included in the present invention. It has also been found that (ii) if the film, of which the elongation is reduced only at the surface portion, is stretched, only the surface layer is finely divided to cause a sort of radical "micro-wrinkles" at the surface layer and (iii) the "micro-wrinkles" result in a roughened surface for providing a high slidability.

Figure 1:
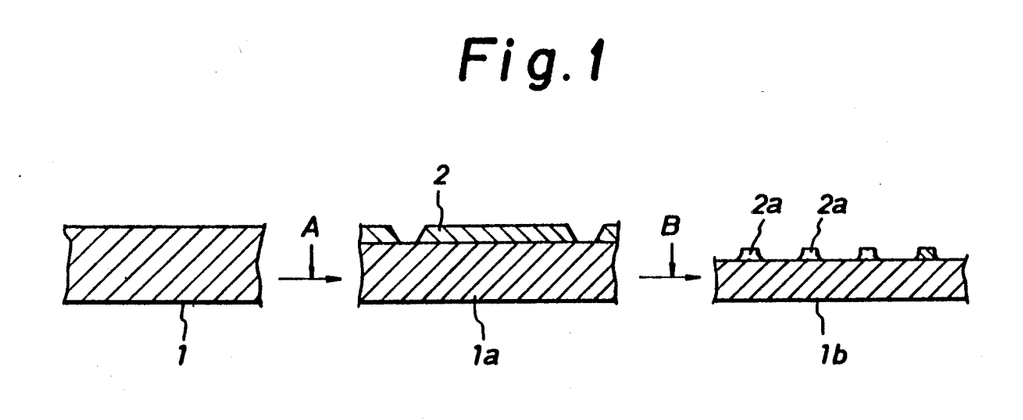
FIG. 1 is to illustrate the basic principle of surface roughening according to the present invention.

The roughened surface thus formed can be understood easily referring to the schematic cross sectional view (FIG. 1) appended herewith. When an amorphous film only consisting of an amorphous layer 1 is treated with a solvent (A) (on one surface of this case), a coarsely cracked crystalline layer 2 is formed at the treated surface and when it is stretched (B), a finely cut crystalline layer 2a is formed being dispersed on the surface of the stretched amorphous layer 1b.

Figure 2A:
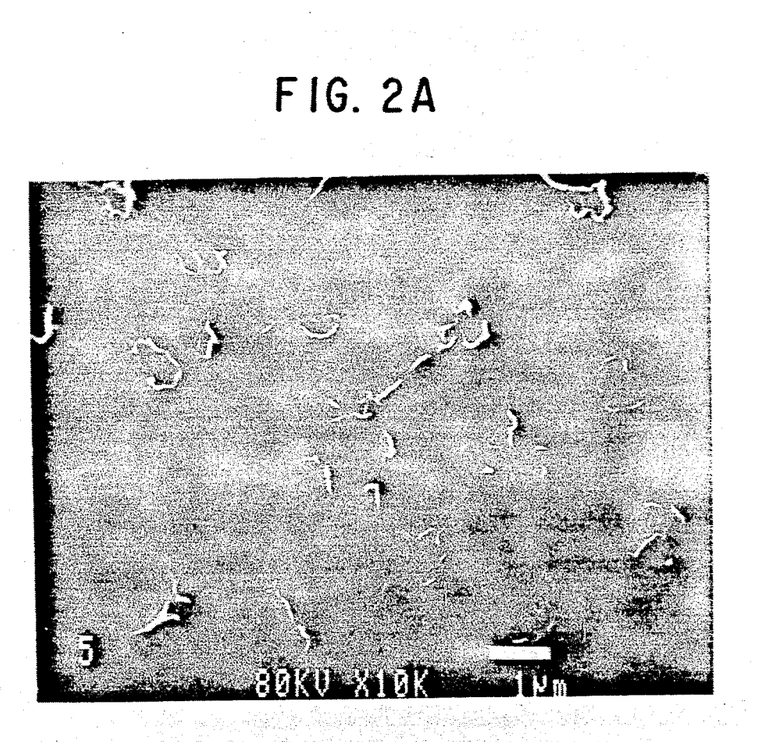
FIGS. 2(A) and 2(B) are, respectively, electron microscopic photographs showing the surface of the easily-slidable PATE film according to the present invention (FIG. 2A) and the surface of the conventional easily-slidable PATE film (FIG. 2B).
Figure 2B:
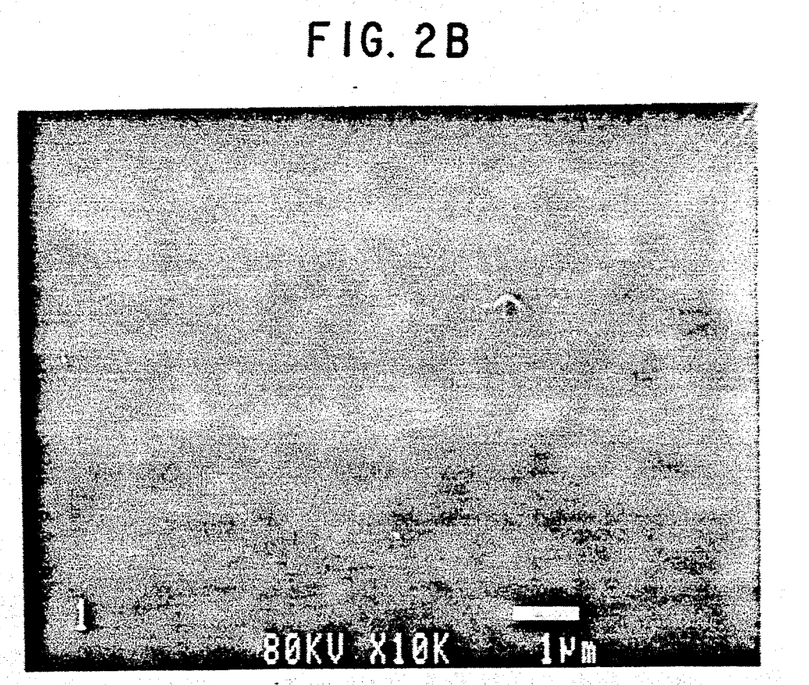

It will be apparent from the electron microscopic observation form the film surface that the thus formed roughened surface is quite different from the roughened surface of the conventional easily-slidable film formed by the addition of powdery lubricant. That is, FIG. 2A shows the surface of a typical easily-slidable PATE film according to the present invention and FIG. 2B shows the surface of a conventional easily-slidable PATE film formed by an addition of powdery lubricant, respectively.

Basic Resin

The PATE as the basic resin for the easily-slidable film according to the present invention means those polymers composed of repeating unit of —Ar—S— (Ar:arylene group) as the constituent.

For the PATE as the starting material of the easily-slidable film according to the present invention, those having p-phenylene group as the main constituent of arylene group are preferred in respect to the physical properties such as heat resistance, moldability and mechanical properties.

The expression "as the main constituent" in the present invention means that the repeating unit of is contained not less than 60 mol % and, preferably, not less than 75 mol % of the total repeating unit of —Ar—S—.

Arylene groups other than p-phenylene group as the main constituents usable herein can include, for example, m-phenylene group o-phenylene group alkyl-substituted phenylene group in which R represents alkyl group, preferably lower alkyl group, and n is an integer from 1 to 4 p,p'-biphenylene-sulfone group p,p'-biphenylene group p,p'-biphenylene ether group p,p'-biphenylene carbonyl group naphthalene group

From this viewpoint of processability, copolymer containing different kind of repeating units are excellent in most cases than homopolymer consisting only of the repeating unit of As the copolymer, a copolymer of is preferred. Particularly, those containing the respective repeating unit in a block form, for example, as described in European Patent Application (Laid-Open) No. 166,451 (1986) are preferred to those containing them in a random form, because use of the block-copolymer is remarkably excellent in physical properties (heat resistance, mechanical property, etc.) while they are substantially equal in the processability.

As the PATE for the starting material of the film according to the present invention, those having substantially linear structure are preferred in respect to the processability and the physical property of the film. However, crosslinked products obtained by using a small amount of crosslinking agent (for example, 1,2,4- trihalobenzene) upon polymerization within a range not impairing the processability and the physical property may also be used.

Uncured PATE is preferred for the polymer as the starting material of the film according to the present invention. Since cured PATEs contain many branched or crosslinked structures, its use involves various problems, in respect to physical properties of the molded products and a processability of the composition, such as poor mechanical strength, severe discoloration and low heat stability upon melt processing.

PATE with the melting point higher than 260° C. is preferable, more preferable higher than 270° C., for the present invention. If the melting point is lower than 260° C., the major feature as a heat resistant polymer is impaired.

A molecular weight in the suitable range is desirable for the PATE as the starting material for the easily-slidable film according to the present invention. Namely, PATE having a molecular weight correpsonding to a range of 0.25 to 0.8 (dl/g), preferably, 0.30 to 0.7 (dl/g) expressed by the inherent solution viscosity $\eta_{inh}$, in 1-chloronaphtahlene solution at a concentration of 0.4 (g/dl) at 206° C. PATE with the inherent solution viscosity $\eta_{inh}$ of less than 0.25 (dl/g) is not preferred since it is difficult to prepare and easily-slidable film as in the present invention and particularly, it is difficult to prepare a film uniformly stretched in a stretching step. While on the other hand, PATE with the solution inherent viscosity $c_{inh}$ of higher than 0.8 (dl/g) is not preferable from the standpoint of fabrication and economical point, since too high melt viscosity makes an extremely high stretching force necessary in the stretching step and accordingly quite expensive and special equipment becomes necessary in the step.

The preferable PATE for the present invention can be manufactured economically, for example, by the process described in U.S. Pat. No. 4,645,826 filed by the present inventors. In addition, a method described in U.S. Pat. No. 3,919,177 in which a polymerization aid such as carboxylic acid salt is added in a large amount to obtain a high molecular weight PATE can also be used. However, the latter method is disadvantageous from an economical point of view.

Easily-Slidable Film According to the Present Invention

Easily-slidable film according to the present invention is a film comprising PATE as described above as the basic resin and containing no substantial amount of powdery lubricant, used in conventional easily-slidable film, such as, calcium carbonate, silica, clay, kaoline and titanium white. "Containing no substantial amount of powdery lubricant" means herein the although such powder is not used as the surface roughening agent in view of the nature of the present invention, it lies within the scope of the present invention to use a small amount of powdery lubricant with the aim other than that for the surface roughening, for example, for adjusting a processability upon melt processing.

The potentially easily-slidable PATE film according to the present invention comprises a substantially amorphous film in which the degree of crystallization at least on one surface of the film, is higher than that of the inside.

Further, the easily-slidable PATE film according to the present invention has, at least one surface thereof, the arithmetic average surface roughness Ra, that is, center-line average height roughness within a range of 2 to 2000 nm, preferably, 5 to 150 nm and the dynamic friction coefficient $\mu k$ within a range of 0.1 to 0.6, preferably, 0.2 to 0.5.

It is difficult to form an easily-slidable film if the arithmetic average surface roughness Ra is less than 2 nm or greater than 200 nm. Further, the film with the dynamic friction coefficient $\mu k$ of less than 0.1 is very difficult to produce from a PATE film, whereas a film with the friction coefficient $\mu k$ in excess of 0.6 is poor in the slidability and both films are not preferable.

While on the other hand, it is preferable for the easily-slidable film according to the present invention that it has the strength at break of not less than 15 kg/mm$^2$, the elongation at break of not less than 20%, the tensile modulus of elasticity of not less than 300 kg/mm$^2$ and the melting point of not lower than 260° C. These values for mechanical and thermal properties are particularly required for the applications such as heat resistant magnetic recording materials, base films, capacitor films, insulation films, etc. The easily-slidable film according to the present invention has physical properties suitable to these applications. Those films having such mechanical and thermal properties can be obtained usually by applying stretching and orientation to PATE amorphous films. In other words, it shows that the easily-slidable PATE films according to the present invention having such physical property values are stretched-non-oriented films.

Method of Measuring Physical Properties of Easily-Slidable Film

The respective physical properties of the easily-slidable film according to the present invention are measured by the following methods:

| | |
|---|---|
| Dynamic friction coefficient $\mu k$: values measured at 25° C. between films at least one of surface, of which is a roughened surface. | according to ASTM D-1894; |
| Arithmetic average surface roughness Ra: $R_a$ is determined by first generating a roughness curve, expressing the roughness curve as a function, $y = f(x)$, and then calculating $R_a$ using the following formula: $$R_a = \frac{1}{l} \int_0^l |f(x)|\, dx$$ where l is the measuring length in the direction of the center line of the reference curve. | according to JIS B0601 |
| Strength at break: | according to ASTM D882 |
| Elongation at break: | according to ASTM D882 |
| Tensile modulus of elasticity: | according to ASTM D882 |
| Melting point: | Differential Scanning Calorimetry (DSC) method |

Preparation of Easily-Slidable Film

The preparation process for the easily-slidable PATE film according to the present invention comprises treating an amorphous PATE film with a specific organic solvent and applying stretching and heat setting and in case of necessarily, heat relaxation.

In addition, as a method of crystallizing only the surface of a substantially amorphous PATE film thereby reducing the elongation at the surface as compared with that of the inside, heat treatment, radiation treatment, UV radiation, laser radiation, chemical treatment such as oxidation or the combination thereof should not be excluded from the scope of the present invention.

(1) Preparation of Amorphous Film

A film suitable, as an amorphous PATE film, for use in the present invention, can be prepared by melt-extruding PATE described above at a temperature not lower than the melting point and not higher than 400° C., and then quenching on a cooling drum or in a cooling medium such as water to a temperature not higher than its secondary transition point.

In the present invention, the amorphous film means those substantially amorphous films, for example, with the degree of crystallization (measured by a density method) of less than about 10%. The density method herein means such a method of drying a sample under a reduced pressure till it reaches a constant weight, then measuring the density by using a density gradient tube and then calculating the degree of crystallization based on the measured value (provided that the density of PATE at the crystallized portion is 1.43 and the density at the amorphous portion is 1.32).

(2) Treatment With Organic Solvent

The production process for the easily-slidable film according to the present invention comprises at first treating the surface of an amorphous PATE film with an organic solvent. This treatment can provide a potentially easily-slidable film, which can further be applied with stretching and heat treatment to get an easily-slidable film.

The temperature for the treatment is within a range of the solidifying point of the solvent up to 130° C., and the organic solvent serves to crystallize only the surface layer of the amorphous film to reduce the elongation thereof. Accordingly, it is not a so-called "etching" effect of dissolving and leaching the amorphous film with the solvent.

While the PATE film can be crystallized also by heat treatment, it is extremely difficult to crystallize thereby only the surface layer selectively. While on the other hand, it is assumed that by the organic solvent treatment according to the present invention in which only the surface of the film is exposed to liquid or vapor of the solvent having an adequate affinity with PATE, the molecule of the solvent intrudes into the PATE film to the surface layer and can selectively crystallize only the surface layer by an effect, so to speak, like molecular rolls. Accordingly, the surface layer of the film can easily be crystallized even at a temperature not higher than the secondary transition point of PATE. While on the other hand, excess temperature for the solvent treatment is not preferred since the crystallized layer formed at the PATE surface is dissolved or leached out.

For the organic solvent used in the step of the organic solvent treatment for the amorphous PATE film according to the present invention, those solvents having appropriate affinity with PATE are preferred. They are used in the form of liquid or, depending on the case, vapor thereof.

Regarding the affinity between PATE and solvent, a SP value (solubility parameter) generally gives an effective measure.

For the purpose according to the present invention, aliphatic hydrocarbons of low SP value and water, alcohols, amines, etc. of excessively high SP value or high hydrogen bonding strength are not preferred.

Accordingly, organic solvents of SP value of 8.5 to 11.5, preferably, of 9 to 11 are preferred as the solvent for use in the present invention.

As the organic solvent applied to the treatment for improving the degree of crystallization at the surface of the film according to the present invention, there can be mentioned the solvents having SP value of 8.5 to 11.5 among the followings: ethers such as tetrahydrofuran and dioxane, etc.; organic amides such as dimethylacetoamide, dimethylformamide, N-methylpyrrolidone, dimethylimidazolidinone, tetramethyl urea, hexamethyl phosphoric triamide, etc.; halogenated hydrocarbons such as chloroform, trichlene, dichloromethane, perchloroethylene, ethylene dichloride, bromobenzenes, etc.; carbon disulfide; ketones such as acetone, methyl ethyl ketone and cyclohexanone, etc.; thioethers such as diphenyl thioether, etc.; aromatic hydrocarbons such as toluene, etc.; esters such as ethyl acetate, etc.; nitro compounds such as nitrobenzene, etc.; pyridines or quinolines; cyano compounds such as cyanobenzene, etc.; and sulfones such as sulforan, etc. They may be used along or as a solvent mixture of two or more of them. Among them, ethers, organic amides and halogenated hydrocarbons and particularly preferable since they have properly high effect. On the other hand, it is somewhat difficult to use carbon disulfide since the effect is too strong. Although, water, alcohols and aliphatic hydrocarbons have no substantial effect, they may be used as the diluent for the above organic solvents. Details for the SP value are disclosed, for example, in "Polymer", 13, 285 p (1971) and the disclosure thereof is to be referred to, when it becomes necessary in the present invention.

The temperature for the organic solvent treatment is preferably higher than the solidifying point of the organic solvent used and not higher than 130° C., particularly, within a range of 0° C. to 100° C. The temperature lower than the solidifying point is not preferred since no substantial crystallization occurs at the surface layer. While on the other hand, temperature in excess of 130° C. is not preferred since the crystallization of inside of the film is also promoted.

The solvent treatment for the amorphous film in the production process of the easily-slidable film according to the present invention is applied for selectively crystallizing only the surface layer of the film thereby reducing the elongation of the surface layer. However, if the crystallized layer is too thick, it is not preferable since breakage of the film occurs upon stretching. As the index expressing the extent of the solvent treatment to get a potentially easily-slidable film, the arithmetic average surface roughness Ra for the solvent-treated film before stretching can be used. This Ra value is usually different considerably from the Ra value for the easily-slidable film obtained after stretching and heat setting.

In the present invention, it is preferable that the organic solvent treatment is applied so that Ra for the solvent-treated potentially easily-slidable film before stretching is within a range of 10 to 150 nm, more preferably, within a range of 15 to 130 nm. Ra value of less than 10 nm is not preferably since it is difficult to reduce the dynamic friction coefficient of the film obtained after stretching to less than 0.6. While on the other hand, if the solvent treatment is applied till Ra exceeds 150 nm, it is not preferable because the crystallized layer usually becomes too thick thereby possibly causing breakage of the film in the stretching step.

It is preferable that the organic solvent treatment is conducted so that Ra for the solvent treated film reaches an adequate value within a range of 10 to 150 nm under a sufficient tempeature and time. Although the adequate treating time therefor varies depending on the factors such as the kind of the solvent used, the extent of its dilution and the treating tempeature, usually it is preferable that the time is in the range of 0.1 to 1,000 seconds, more preferably 0.5 to 500 seconds. Treating time of less than 0.1 second is not preferred since the control for the treating time is extremely difficult. While on the other hand, treating time in excess of 1,000 seconds is not preferred in respect to industrial productivity and an economical point, since the productivity of the easily-slidable film is remarkably reduced.

The organic solvent and the amorphous film may be brought into contact with each other by means of an optional method along with the purpose. Immersion of a film into a solvent, coating of a solvent to the surface of the film, exposure of the surface of the film to the vapor of the solvent, etc. are generally preferred. The preferable controlling method of the time of contact is by washing off or diluting the solvent deposited on the surface with liquid such as alcohol or aliphatic hydrocarbon at a predetermined time after the contact, or by evaporating or removing the solvent by means of heating or pressure reduction at a predetermined time after the contact. From the standpoint of easy removal of the solvent, the boiling point of the solvent for use in the surface treatment is preferable not higher than 150° C., more preferably, not higher than 100°.

(3) Stretching

Stretching is preferably conducted to the potentially easily-slidable film, by applying stretching in one direction or simultaneous and/or sequential stretching in two directions with or without preheating within such a range of temperature as the crystallization of the film does not progress, at a range of stretching temperature 70° to 130° C., preferably, 80° to 120° C. within an area stretching factor from 4 to 18 times, preferably, 8 to 16 times by using an adequate device, for example, rolls or tenters.

Stretching temperature lowers than 70° C. is not preferred since the film may be broken. While on the other hand, the temperature in excess of 130° C. is not preferred since coarse spherulites may be formed and the film becomes white. If the area of stretching factor is less than 4 times, it is not preferred since coarse spherulites may be formed to result in whitening or forming wrinkles in the subsequent heat setting step. On the other hand, the stretching factor in excess of 18 times is not preferred since the film probably be broken.

By applying the stretching, mechanical and thermal properties of film can be improved and an appropriately roughened surface can be formed on the film surface thereby obtaining the easily-slidable film in a higher level.

(4) Heat treatment

(i) Heat Setting

The film stretched to orient in one direction or two directions is subjected to heat setting at a heat setting temperature within a range of 180° to 280° C., preferably, 200° to 270° C., for a heat setting time within a range of 1 to 2,000 seconds, preferably, 5 to 1,000 seconds. If the heat setting temperature is lower than 180° C., improvement in the heat resistance of the film can be insufficient and is not preferable. While on the other hand, if the temperature is in excess of 280° C., film may be undesirably be melted again. Further, if the heat setting time is less than 1 second, improvement in the heat resistance of the film may be insufficient. While on the other hand, if it exceeds 2,000 seconds, the film may be degraded thermally or the productivity may be reduced remarkably. All these cases are not preferable either.

By the heat setting treatment, the heat resistivity of the film can be improved and, in addition, the roughened surface formed in the stretching step can be stabilized.

(ii) Heat Relaxation

The film after subjected to the stretching and heat setting may further be applied with heat relaxation in the case of necessity. That is, heat relaxation is conducted at a heat treating temperature within a range of 180° to 280° C., more preferably, 200° to 270° C., for a heat treating time within a range of 1 to 2,000 seconds, preferably, 5 to 1,000 seconds.

If the heat relaxation temperature is lower than 180° C. the heat relaxation effect for the film may become insufficient. While on the other hand, if it exceeds 280° C., the film may possibly be melted again. Further, if the heat relaxation time is less than 1 second, the heat relaxing effect probably becomes insufficient. While on the other hand, if it exceeds 2,000 seconds, the film may thermally be degraded or the productivity is reduced remarkably.

By the heat relaxing treatment, dimensional stability of the film at high tem;)erature can be improved.

Application of the Film According to the Present Invention

The easily-slidable PATE film according to the present invention is an easily-slidable film with no requirement of powdery lubricants, which has less defects, can be controlled in the surface roughness relatively easily, is excellent in the mechanical properties and has heat resistance and moisture proofness superior to those of polyester films and, accordingly, it can be applied generally as base films for high performance magnetic recording material (particularly for vapor deposition type, etc.), as well as for base films for use in high performance capacitor films (particularly, chip capacitor, etc.), insulation films, printer tapes, phonographic films, etc. Furthermore, the film according to the present invention having higher surface roughness also has advantageous features of easy plating, printing or bonding and, accordingly, it is suitable for printed wiring substrates, printing films, coating films, etc.

EXPERIMENTAL EXAMPLE

The present invention will now be described specifically in the following experimental examples by way of specific examples but the invention is no way restricted only thereto.

SYNTHESIS EXAMPLE 1

Into an autoclave lined with titanium, 64.5 kg of hydrous sodium sulfide (solid content: 46.12%) and 163.5 kg of N-methylpyrrolidone (NMP) were charged and temperature was elevated to about 203° C. to distill out 32 kg of water. 1.2 kg of water and 49.5 kg of NMP were additionally supplied (total water content/NMP = 2.4 mol/kg). Then, 60.5 kg of m-dichlorobenzene was charged (total arylene group/NMP = 1.9 mol/kg).

Polymerization was conducted under the conditions at 230° C./2 hours and 235° C./8 to obtain a slurry M-1 containing the resultant (m-phenylene thioether)-prepolymer.

While on the other hand, 304.6 kg of hydrous sodium sulfide (solid content: 46.12%) and 820 kg of NMP were charged in an autoclave lined with titanium and temperature was elevated to about 203° C. to distill out 116 kg of water. 1 kg of water and 52 kg of NMP were additionally supplied (total water content/NMP = 3.0 mol/kg). Then, 259 kg of p-dichlorobenzene was charged (total arylene group/NMP = 2.0 mol/kg).

Reaction was conducted under the condition at 215° C./10 hours. Then, 72% of the slurry M-1 and 151 kg of water were added and polymerized under the condition at 260° C./5 hours to obtain a slurry containing the resultant block copolymer.

The resultant slurry was sieved through a screen of 0.1 mm mesh to separate only the granular polymer, which was washed with acetone and then with water to obtain a cleaned polymer. The cleaned polymer was dried at 80° C. under a reduced pressure to obtain a polymer A. The solution inherent viscosity $\eta_{inh}$ of the polymer A (in 1-chloronaphthalene solution at 0.4 g/dl concentration at 206° C. hereinafter, the viscosity is measured under this condition) was 0.38 (dl/g).

SYNTHESIS EXAMPLE 2

Into an autoclave lined with titanium, 371 kg of hydrous sodium sulfide (solid content: 46.27%) and 1,028 kg of NMP were charged and temperature was elevated to about 203° C. to distill out 143 kg of water. 4 kg of water and 45 kg of NMP were additionally supplied (total water content/NMP = 3.0 mol/kg). Then 318 kg of p-dichlorobenzene was charged (total arylene group/NMP = 2.0 mol/kg).

Polymerization was conducted under the conditions at 220° C./5 hours and then 96.5 kg of water was additionally supplied (total water content/NMP = 8.0 mol/kg).

Polymerization was conducted under the condition at 256° C./5 hours and 244° C./9 hours to obtain a slurry containing the resultant polymer.

The slurry was sieved through a screen of 0.1 mm mesh to separate only the granular polymer, which was washed with acetone and then with water to obtain a cleaner polymer. The cleaner polymer was dried at 80° C. under a reduced pressure to obtain a polymer B. The solution inherent viscosity $\eta_{inh}$ of the polymer B was 0.43 (dl/g).

SYNTHESIS EXAMPLE 3

Into an autoclave lined with titanium, 427 kg of hydrous sodium sulfide (solid content: 45.70%) and 925 kg of NMP were charged and temperature was elevated to about 203° C. to distill out 173 kg of water. 3.5 kg of water and 51.5 kg of NMP were additionally supplied (total water content/NMP = 3.5 mol/kg). Then, 374 kg of p-dichlorobenzene was charged (total arylene group/NMP = 2.6 mol/kg).

Polymerization was conducted under the condition at 220° C./5 hours and 61.5 kg of water was additionally supplied (total water content/NMP = 7.0 mol/kg). Polymerization was conducted under the condition at 255° C./5 hours to obtain a slurry containing the resultant polymer.

The resultant slurry was sieved through a screen of 0.1 mm mesh to separate only the granular polymer which was washed with acetone and then with water to obtain a cleaned polymer. The cleaned polymer was dried at 80° C. under a reduced pressure to obtain a polymer C. The solution inherent viscosity $\eta_{inh}$ of the polymer C was 0.22 (dl/g).

AMORPHOUS FILM PREPARATION EXAMPLE 1

Part of each polymers A, B, and C obtained as described above was supplied to an extruder, melted at 320° C., extruded into a strand-like shape, rapidly cooled with water and cut to pieces and pellets A, B and C were prepared. Each of the pellets A, B and C were respectively supplied to an extruder, melted at 320° C., extruded from a T die having a linear lip and then case on a metal drum to cool and solidify. During the extrusion, to a pinning wire which was stretched in parallel with the drum axis apart by about 0.5 cm from the position where the extruded molten product was in contact with the drum, static electricity of 7 KV was applied. The resultant amorphous films A, B and C had a thickness of 150 μm and density of 1.324 g/cm$^3$, 1.323 g/cm$^3$ and 1.325 g/cm$^3$, respectively.

AMORPHOUS FILM PREPARATION EXAMPLE 2

Kaoline powder of 300 nm in average diameter was added by 0.1 (PHR) to a portion of the polymer A obtained as described above and blended in a mixer to prepare an amorphous film (A2) in the same manner as in Preparation Example 1. The amorphous film (A2) had a thickness of about 150 μm and the density of 1.325 g/cm$^3$.

PREPARATION EXAMPLES 1-20 FOR EASILY-SLIDABLE FILMS

Amorphous films A, B, C and A2 obtained as described above were subjected to treatment while varying the organic solvent, temperature and treating time as shown in Table 1 and, directly after the treatment, immersed in methanol to remove the treating solvent and then air dried.

The air-dried product was stretched to orient at 99° C. by 3.5 times in one direction and by 3.5 times in the direction of the right angle thereto sequentially by using a small size film stretcher (manufactured by T. M. Long Co.) to prepare stretched film. Those stretched films not broken during stretching were set to a metal frame and applied with heat setting treatment at 263° C./5 minutes. The resultant heat set film was detached from the frame and applied with heat relaxation in a free state at 257° C./2 minutes.

The surface roughness and the dynamic friction coefficient were measured for the air-dried films and stretched, heat-set and heat relaxed films obtained therefrom according to JIS B-0601 and ASTM D 1894 (25° C.) respectively. Number of abnormally coarse projections greater than 200 nm was also determined together with the measurement for the surface roughness. These results are shown collectively in Tables 1 and 2.

TABLE 1

| Exp. No. | Film | Solvent treatment treated surface | Solvent (wt. ratio) | Temp. (°C.) | Time (sec) | Ra (nm) | Stretched, heat set film property m.p. (°C.) | *1) | *2) | *3) | Ra (nm) | *4) | μk *5) | Remark |
|---|---|---|---|---|---|---|---|---|---|---|---|---|---|---|
| 1 | A | — | — | — | — | — | 277 | 26/25 | 70/80 | 380/380 | 5 | 0 | >1 | Comp. Ex. *6 |
| 2 | B | — | — | — | — | — | 280 | 27/26 | 60/70 | 390/380 | 6 | 0 | >1 | Comp. Ex. *6 |
| 3 | A | single | THF/acetone (85/15) | 24 | 5 | 20 | 277 | 25/24 | 65/75 | 370/360 | 30 | 0 | 0.3 | |
| 4 | B | single | THF/acetone (85/15) | 24 | 5 | 15 | 280 | 24/23 | 60/70 | 380/360 | 25 | 0 | 0.3 | |
| 5 | C | single | THF/acetone (85/15) | 24 | 5 | 25 | — | — | — | — | — | — | — | Comp. Ex. *7 |
| 6 | A2 | single | THF/acetone (85/15) | 24 | 5 | 30 | 278 | 19/18 | 70/90 | 320/350 | 40 | 9 | 0.4 | Comp. Ex. *8 |
| 7 | B | both | dioxane | 60 | 2 | 20 | 277 | 20/20 | 80/90 | 350/350 | 30 | 0 | 0.4 | |
| 8 | A | both | choloroform | 25 | 2 | 25 | 280 | 23/22 | 65/70 | 350/330 | 40 | 0 | 0.3 | |
| 9 | B | both | NMP | 25 | 2 | 90 | 277 | 17/16 | 40/60 | 320/310 | 140 | 0 | 0.5 | |
| 10 | A | both | DMC | 40 | 2 | 20 | 277 | 24/24 | 70/75 | 370/350 | 30 | 0 | 0.4 | |

In this Table, THF means tetrahydrofuran and DMC means dimethyl acetamide.
*1): Strength at break (kg/mm²)
*2): Elongation at break (%)
*3): Tensile modulus of elasticity (kg/mm²)
*4): Number of abnormally coarse projection larger than 200 nm
*5): μk in the column indicated by "single" in the line of "treated surface" represents a value between a solvent treated surface and a not-treated surface, while μk in the column indicated by "both" represents a value between solvent treated surfaces
*6): Without solvent treatment.
*7): Broken at stretching.
*8): Many abnormally coarse projections.

TABLE 2

| Exp. No. | Film | Solvent treatment treated surface | Solvent (wt. ratio) | Temp. (°C.) | Time (sec) | Ra (nm) | Stretched, heat set film property m.p. (°C.) | *1) | *2) | *3) | Ra (nm) | *4) | μk *5) | Remark |
|---|---|---|---|---|---|---|---|---|---|---|---|---|---|---|
| 11 | B | both | *6) | 60 | 2 | 20 | 280 | 19/18 | 80/90 | 340/320 | 40 | 0 | 0.4 | |
| 12 | A | both | *7) | 25 | 2 | 25 | 277 | 22/20 | 80/95 | 350/320 | 25 | 0 | 0.5 | |
| 13 | B | both | *8) | 25 | 2 | 20 | 280 | 23/23 | 90/100 | 340/320 | 35 | 0 | 0.5 | |
| 14 | A | both | *9) | 24 | 2 | 30 | 277 | 20/17 | 90/95 | 320/320 | 40 | 0 | 0.5 | |
| 15 | A | single | NMP | 80 | 5 | >200 | — | — | — | — | — | — | — | Comp. Ex. *11) |
| 16 | B | single | CS₂ | 25 | 5 | >200 | — | — | — | — | — | — | — | Comp. Ex. *11) |
| 17 | B | single | water | 40 | 30 | 6 | 280 | 26/26 | 70/80 | 390/370 | 7 | 0 | >1 | Comp. Ex. |
| 18 | A | both | methanol | 25 | 30 | 7 | 277 | 26/25 | 80/80 | 390/380 | 7 | 0 | >1 | Comp. Ex. |
| 19 | A | both | hexane | 25 | 30 | 8 | 277 | 26/24 | 70/90 | 380/360 | 8 | 0 | >1 | Comp. Ex. |
| 20 | B | both | *10) | 204 | 5 | — | — | — | — | — | — | — | — | Comp. Ex. *12) |

In this Table, NMP means N-methylpyrrolidone.
*1): Strength at break (kg/mm²)
*2): Elongation at break (%)
*3): Tensile modulus of elasticity (kg/mm²)
*4: Number of abnormally coarse projection larger than 200 nm
*5): μk in the column indicated by "single" in the line of "treated surface" represents a value between a solvent treated surface and a not-treated surface, while μk in the column indicated by "both" represents a value between solvent treated surfaces
*6): Dioxane/toluene (80/20)
*7): CS₂/NMP/pyridine (10/60/30)
*8): Nitrobenzene/trichlene (20/80)
*9): Ethylacetate/tetrahydrofuran (10/90)
*10): 1-Chloronaphthalene
*11): Broken at stretching
*12): Film was partially dissolved and remarkably deformed

Plating Example

Films of Comparative Example and according to the present invention obtained in Preparation Examples 2 and 9 for easily-slidable films were applied with chemical copper plating as described below.

(i) Catalyzing Treatment

Both of the films were subjected to immersion in a catalyzing solution of 100 ml in total volume comprising 0.020 g PdCl₂/0.2 g SnCl₂/10 ml HCl/water for 10 minutes respectively.

(ii) Water Washing

The resultant catalyzed film were washed with deionizable water.

(iii) Chemical Copper Plating Treatment

The washed films were subjected to immersion in a plating solution of 100 ml of total volume containing 1.56 g CuSO$_4$.5H$_2$O/1.0 g NaOH/5.0 g NaKC$_4$H$_4$O$_6$.4H$_2$O/1.0 ml 37% formalin/water at 0° C. for 20 minutes.

(iv) Water Washing

The plated films were sufficiently washed with deionized water and air dried.

Among the resultant copper plated films, plating metal was firmly adhered on the plated films obtained from the film according to the present invention, whereas plated metal was easily defoliated even by slight rubbing on the plated films obtained from the film of the Comparative Example.

What is claimed is:

1. An easily-slidable polyarylene thioether film comprising a film containing, as the basic resin, a polyarylene thioether mainly composed of repeating unit of and not containing substantial amount of powdery lubricant, which has the surface properties including the arithmetic average surface roughness Ra within a range of 2 to 200 nm and the dynamic friction coefficient $\mu k$ within a range of 0.1 to 0.6 at least on one side of the film.

2. The easily-slidable polyarylene thioether film as defined in claim 1, wherein the strength at break is not less than 15 kg/mm$^2$, the elongation at break of not less than 20%, the tensile modulus elasticity of not less than 300 kg/mm$^2$ and the melting point of not lower than 260° C.

3. The easily-slidable polyarylene thioether film as defined in claim 1, wherein the solution inherent viscosity $\eta_{inh}$, in 1-chloronaphthalene solution at a concentration of 0.4 g/dl at 206° C., of said polyarylene thioether is in the range of 0.25 to 0.8 dl/g.

* * * * *